United States Patent [19]

La Mori et al.

[11] Patent Number: 4,528,169
[45] Date of Patent: Jul. 9, 1985

[54] PROCESS TO ABATE GEOTHERMAL HYDROGEN SULFIDE

[75] Inventors: Phillip N. La Mori, Bakersfield; Chien-Cheng J. Shih, Irvine, both of Calif.

[73] Assignee: Occidental Research Corporation, Los Angeles, Calif.

[21] Appl. No.: 527,136

[22] Filed: Aug. 29, 1983

[51] Int. Cl.³ .............................................. B01D 53/34
[52] U.S. Cl. .................................. 423/231; 423/224; 423/DIG. 18
[58] Field of Search ........ 423/224, 230, 231, DIG. 19

[56] References Cited

U.S. PATENT DOCUMENTS

| | | | |
|---|---|---|---|
| 4,196,183 | 4/1980 | Li | 423/230 X |
| 4,330,307 | 5/1982 | Coury | 62/23 |
| 4,374,106 | 2/1983 | Tipton et al. | 423/231 |

Primary Examiner—Earl C. Thomas
Attorney, Agent, or Firm—Fowler, Lambert & Hackler

[57] ABSTRACT

A process for removing hydrogen sulfide from geothermal steam and from vent streams, or concentrated portions produced by a hydrogen sulfide separation process, includes the steps of introducing an oxygen-containing gas, such as air into the steam, or vent stream, and thereafter contacting the steam and oxygen-containing gas in a contacting stage with iron oxide supported by a carrier resistant to deterioration. The steam having a temperature of at least 250° F. is mixed with oxygen to provide a molar ratio of oxygen-to-hydrogen sulfide ratio of less than about 10. During the contacting stage the pressure of the steam and oxygen-containing gas is maintained at a pressure sufficient to enable removal of a majority of the hydrogen sulfide from the steam and oxygen-containing gas.

35 Claims, 2 Drawing Figures

PROCESS TO ABATE GEOTHERMAL HYDROGEN SULFIDE

BACKGROUND OF THE INVENTION

The present invention relates generally to the purification of steam produced by geothermal sources and more particularly to a process for abating, or removing, the hydrogen sulfide content of the steam.

In many areas of the world, geothermal steam is present at temperatures and pressures sufficient for utilization in turbines for the generation of electricity. Unfortunately, the geothermal steam contains a number of contaminating gases such as carbon dioxide, ammonia, nitrogen and hydrogen sulfide among others.

It has been widely recognized that in many instances, the hydrogen sulfide content of geothermal steam is sufficiently high to make discharge of the steam into the air environmentally unexceptable.

Therefore, it has been the object of many investigators to remove, or abate, the hydrogen sulfide in the geothermal steam in order to make release to the atmosphere an exceptable procedure.

Many methods for removing hydrogen sulfide from gases, have been developed. For example, gas containing hydrogen sulfide may be contacted with activated carbon to catalyze the oxidation of hydrogen sulfide to elemental sulfur and water. Some investigators, for example, see U.S. Pat. No. 4,330,307 issued to Coury in 1982, have developed methods to separate the geothermal steam into a usable portion, having a low hydrogen sulfide content, and a vent portion or stream, containing the majority of the hydrogen sulfide, the latter being disposed of by reinjection into the ground. Reinjection of this vent portion is not desireable, however, because the $H_2S$ may migrate and present itself in newly extracted steam.

The process described in U.S. Pat. No. 4,374,106 to Tipton is directed to a process for removing hydrogen sulfide from a geothermal steam by contacting the steam which is mixed with an oxygen containing gas, such as air, with iron oxide and wherein the molar ratio of oxygen to hydrogen sulfide in the steam and oxygen containing gas is at least 10.

It has now been discovered that hydrogen sulfide can be effectively removed from geothermal steam by mixing an oxygen containing gas with the geothermal steam to provide a molar ratio of oxygen to hydrogen sulfide less than 10 and contacting the mixture with iron oxide under specific process conditions. Further, it has been found that elemental sulfur can be recovered on a continuous basis from the geothermal steam after it is contacted with the iron oxide.

More specifically, the process is effective in removing high concentration, of hydrogen sulfide from geothermal steam such as concentrated in the vent stream of processes such as described by Coury (U.S. Pat. No. 4,330,307).

These results are unexpected and not anticipated by the prior art which has been extensively discussed in Tipton et. al. (U.S. Pat. No. 4,374,106).

SUMMARY OF THE INVENTION

In accordance with the present invention a process for removing hydrogen sulfide from geothermal steam includes the steps of introducing an oxygen-containing gas into steam produced by a geothermal source, contacting steam and oxygen containing gas in a contacting stage with iron oxide supported by a carrier resistant to deterioration by the steam and providing the steam and oxygen-containing gas in the contacting stage at a pressure sufficient to enable removal of a majority of hydrogen sulfide from the steam and oxygen containing gas.

The steam comprises water vapor and hydrogen sulfide and has a temperature of at least 250° F. while the oxygen-containing gas is introduced into the steam in an amount to provide a molar ratio of oxygen-to-hydrogen sulfide in the steam and oxygen-containing gas to be less than about 10.

More particularly, the process for removing hydrogen sulfide for geothermal steam in accordance with the present invention includes the steps of removing the steam from the geothermal source, throttling the removed steam to a preselected pressure, straining the throttled steam to remove any large solid particles, separating any liquid droplets from the strained steam, introducing the separated steam and air into a first stage thermal compressor in which the air is compressed and mixed with the steam introduced thereinto. The mixed compressed air and steam are withdrawn from the first stage thermal compressor and introduced into a second stage thermal compressor with additional strained steam to further compress the mixed compressed air and steam to a final mixture of compressed air and steam having a molar ratio of oxygen-to-hydrogen sulfide of less than about 10.

The final mixture is contacted in a reactor with iron oxide supported by pumice and the pressure of the final mixture in the reactor is controlled by means of a back pressure valve. Finally, the steam having a majority of the hydrogen sulfide removed therefrom is removed from the reactor and vented to the atmosphere.

Alternatively, when the concentration of the hydrogen sulfide in the geothermal steam is sufficiently high, elemental sulfur may be separated from the steam and air after it passes through the reactor.

BRIEF DESCRIPTION OF THE DRAWINGS

The invention will be more readily understood by reference to the accompanying drawings in which.

DETAILED DESCRIPTION

Figure 1:
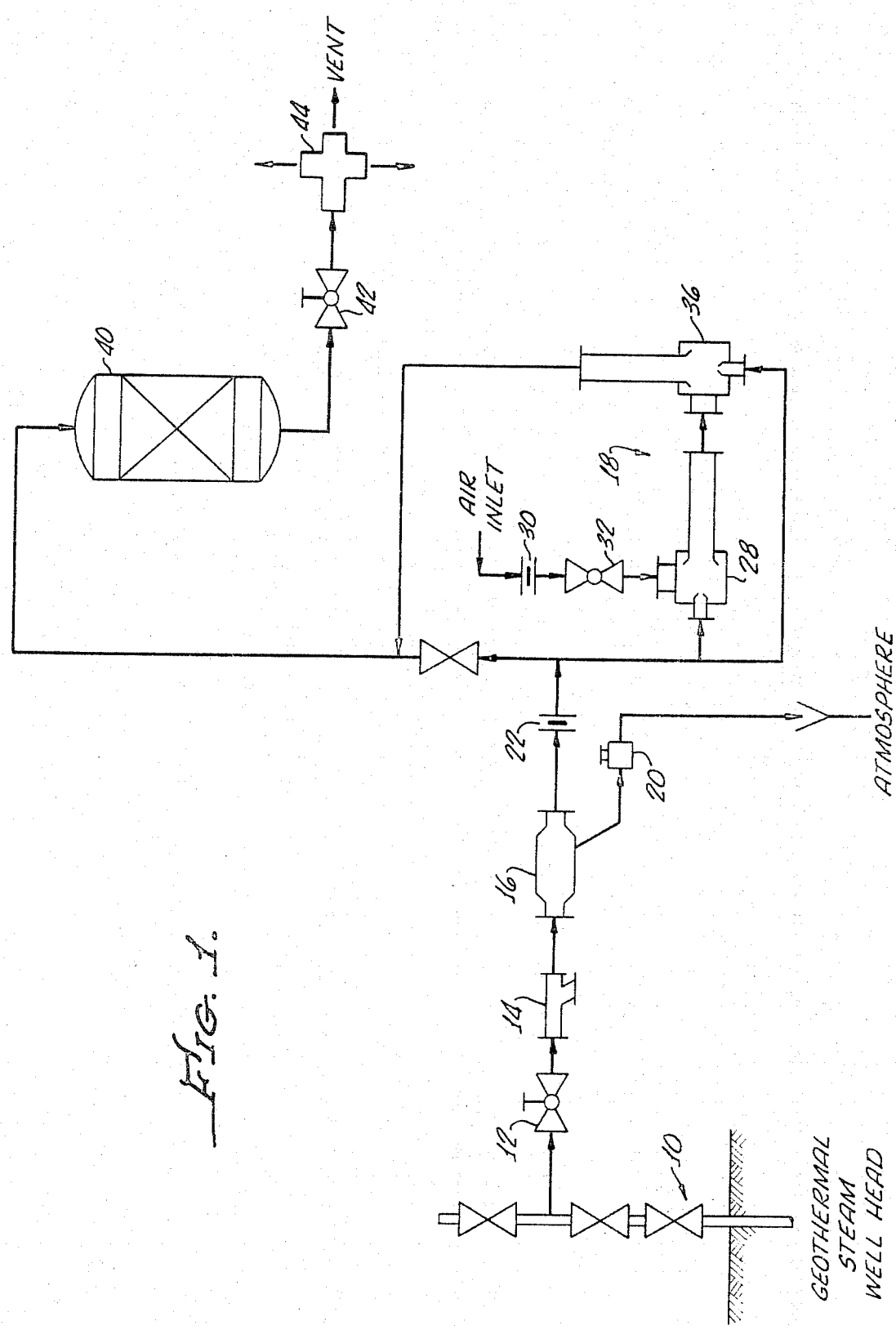
FIG. 1 is a flow diagram of the geothermal hydrogen sulfide removal process in accordance with the present invention utilizing a steam ejector system for compressing the air used in the process as an oxygen-containing gas; and, FIG. 2 is a flow diagram of the geothermal hydrogen sulfide removal process in accordance with the present invention showing its use in connection with a hydrogen sulfide separation system and showing the separation of elemental sulfur from the steam.

As illustrated in FIG. 1, geothermal steam from a geothermal steam well head 10 may be throttled by an inlet steam throttle valve 12 to a preselected pressure. The preselected pressure may vary depending upon the quantity and final utilization of the steam from which hydrogen sulfide has been removed in addition to other parameters including the size and volume capability of the overall process equipment.

Downstream from the throttle valve 12 is a strainer 14 and an in-line steam separator 16, both of which may be of conventional design for removing any large solid particles and liquid droplets from the geothermal steam extracted from the well head 10. The liquids removed by the in-line steam separator 16, which may otherwise cause damage to the thermal compressor 18 are discharged to the atmosphere through a steam trap 20.

After separation of the solids and liquids therefrom, the steam flow rate may be measured by orifice flow meter 22, as it is introduced into the first stage 28 of the thermal compressor, or ejector 18. The two-stage ejector, 18 may be of conventional design and utilizes the steam ejected thereinto for compressing air, which is introduced to the first stage 28, through an air flow meter 30 and an air throttle valve 32.

A distinct advantage is realized through the use of the thermal compressor 18 because part of the geothermal steam to be treated is utilized as the motive force in compressing and mixing the air, which is the oxygen-containing gas, with the geothermal steam.

It is to be appreciated that a separate air compressor (not shown) which may be driven by an electric motor or diesel engine may be utilized to compress the air to the proper pressure, however additional power must be provided therefore and its use will not realize to the fullest extent the advantages and features of the present invention.

The effluent from the first stage 28 is passed through a second stage 36 of the thermal compressor 18 along with additional steam which has been strained to remove solid particles and liquid droplets contained therein. A final mixture of steam and air is then produced by the second stage 36 which has a molar ratio of oxygen-to-hydrogen sulfide of less than about 10.

Preferably, when the pressure of the final mixture of steam and air is about 100 psi, the molar ratio of oxygen-to-hydrogen sulfide in the steam and air final mixture is approximately 5.

This is to be distinguished from the process described by Tipton in U.S. Pat. No. 4,374,106 which is directed to a similar process in which the oxygen to hydrogen sulfide ratio in the steam and air final mixture is greater than 10. Tipton found that with oxygen-to-hydrogen sulfide molar ratio less than about 10, the amount of hydrogen removed from the geothermal steam was significantly reduced.

The molar ratio of oxygen-to-hydrogen sulfide is controlled by adjusting the valve 32 and may be monitered by the air flow meter 30.

The final mixture of steam and air is passed through a reactor 40 packed with an iron oxide, which is coated on a carrier suitable for withstanding steam and water at the operating temperatures and pressures without deterioration thereof. Pumice may be suitable for this carrier, but other carriers which may absorb water, expand or crumble are not desirable. The pressure in the reactor 40 may be regulated by a valve, or orifice plate, 42 which is situated down-stream from the reactor 40.

Following removal of the steam having a majority hydrogen sulfide removed therefrom in the reactor 40, the steam is vented to the atmosphere through a rock muffler 44 or the like to reduce the noise level of the exiting steam.

Figure 2:
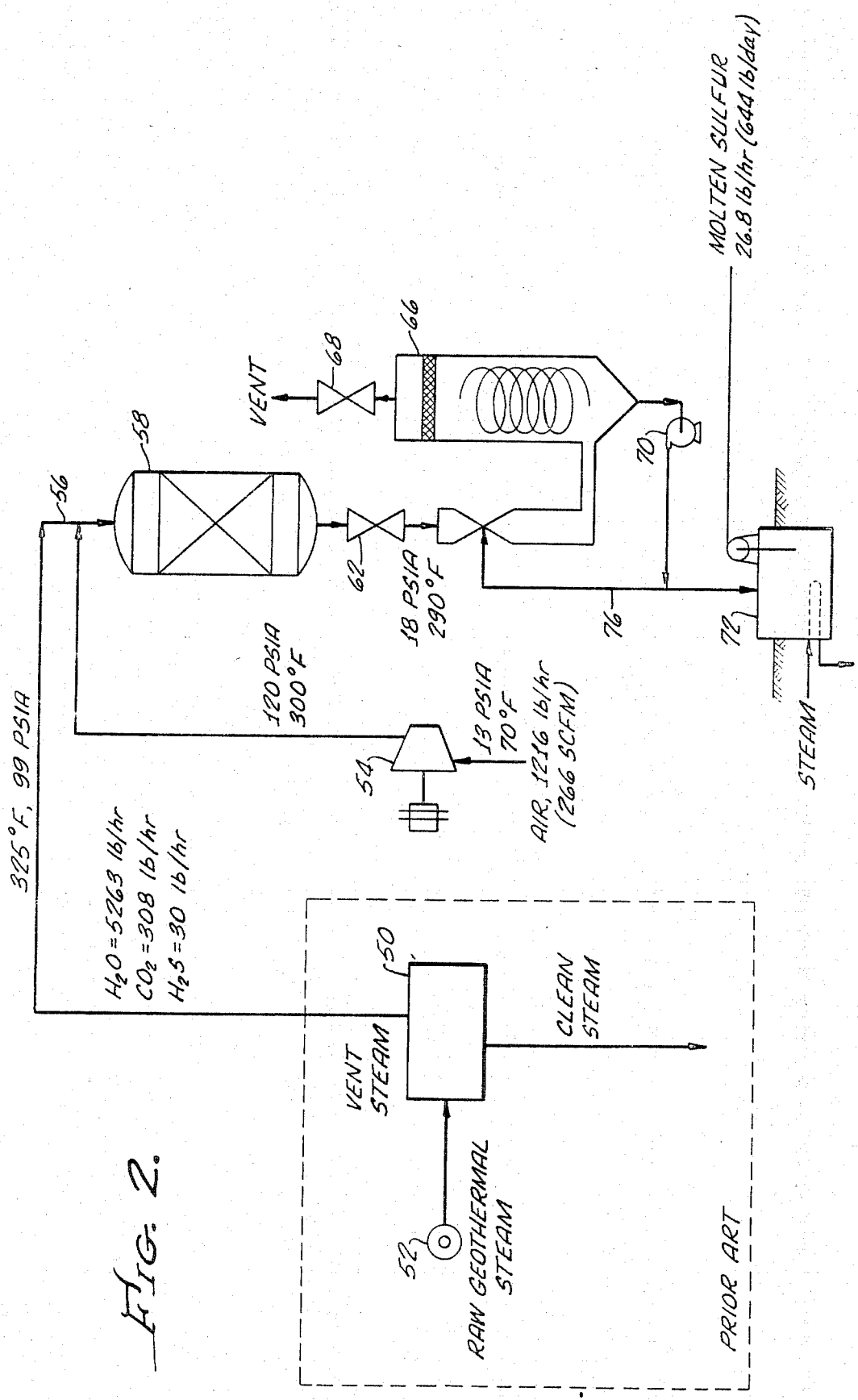

Turning now to FIG. 2 there shown another embodiment of the present invention used in conjunction with a hydrogen sulfide concentrator 50 such as that described by Coury in U.S. Pat. No. 4,330,307 for separating geothermal steam from a well head 52 into clean useable steam and a vent portion, or stream, having a high concentration hydrogen sulfide. Typical operating parameters in terms of gas flow temperatures and pressures are indicated in FIG. 2 adjacent to the lines representing the flow of gases and indicate flow rates expected for providing steam to a 5 mega-watt electric generating plant.

Usually, the distribution of $H_2S$ between the vent stream and the bulk stream is a function of the fraction of the inlet stream that is vented. According to Coury, about 94% of the inlet $H_2S$ will be in the vent stream, if 5% of the total inlet stream is vented. That is, the $H_2S$ content of the vent stream will be about 20 times more concentrated than the inlet stream. Hence, if the concentration of $H_2S$ in the geothermal steam is about 100 ppm (parts per million), the concentration of $H_2S$ in the vent portion, or stream, will be about 2000 ppm.

Prior art teachings, as represented by a consultant report prepared by the Stanford Research Institute for the California Resource Conservation and Development Commissioner on page D-6, last paragraph, shows that: "Once the sulfur melts and flows over the surfaces of the granules of absorbent, it will form an impervious film and make the absorbent surface inaccessible to the $H_2S$. If the quantity of sulfur in the absorbent bed were sufficient when melting occurred, the molten sulfur could flow through the bed in the direction of gas flow, making the entire bed inoperative. Upon shutdown, the freezing of the sulfur would virtually cement the absorbent mass together, so that it would have to be chipped out. Consequently, the steam temperature must be limited to not more than about 230° F."

Thus, it is apparent that the present invention produces an unexpected result in that it is effective in removing $H_2S$ from concentrated vent streams, and, additionally useful in recovering elemental sulfur from the vent stream of a Coury type process, the latter adding economic advantage to the invention.

In accordance with the present invention an externally driven compressor 54 may be used to compress air, as an oxygen-containing gas, to approximately 120 psia after which it is mixed with the vent stream flowing from the concentrator 50 in a conduit 56 prior to entering the reactor 58.

As was previously discussed, a reactor back pressure valve 62 may be used to provide the steam and oxygen-containing gas in the reactor, or contacting stage, at a pressure sufficient to cause formation of elemental sulfur and removal of hydrogen sulfide from the steam and oxygen-containing gas.

The elemental sulfur remains as a vapor in the steam and oxygen-containing gas and is passed by the reactor back pressure valve into a conventional venturi scrubber 66 for separating the elemental sulfur from the steam and oxygen-containing gas. The steam and air are then vented through a valve 68 from the scrubber 66 and the sulfur is passed by a pump 70 to a steam heated storage tank 72 for accumulation of the sulfur which is kept in a molten form for later transportation. Part of the sulfur stream may be recirculated through the venturi scrubber 66 via a conduit 76, to serve as the scrubbing medium.

The following examples are provided for the purpose of showing the process of the present invention in removing hydrogen sulfide from geothermal steam.

EXAMPLES

Example 1

247 grams of Iron Oxide catalyst (the catalyst support was Lake County, California Red Pumice) was packed in a stainless steel 316 column of 2.3 cm I.D., The bed height was about 58 cm. The reactor temperature was maintained at 314° F., pressure at 85 psia. steam flow rate=95 grams/hr., Oxygen flow rate=341 cm³/min, a gas mixture 160 cm³/min (containing 5.41% of $H_2S$ by volume, the balance is nitrogen). The above three gas streams were well mixed and sent to the top of reactor. This reactor inlet gas stream has $H_2S$ content 5305 ppm by weight. The $O_2$ to $H_2S$ molar ratio is 3.93. The effluent gas from the reactor contained only 912 ppm by weight of $H_2S$. Therefore, the $H_2S$ removal by the reactor was 82.8%.

Example 2

The same reactor used in example 1 was operated under the following conditions:
  Steam flow rate=88.6 grams/hr.
  Steam pressure=85 psia.
  Oxygen flow rate=17.1 cm³/min.
  $H_2S$ & $N_2$ mixture flow rate=80 cm³/min (containing 5.41% by volume of $H_2S$)

The reactor inlet stream's $H_2S$ content was 3825 ppm by weight. The oxygen to $H_2S$ molar ratio was 3.95. The measured $H_2S$ content in the reactor effluent was only 99 ppm wt. Therefore, the $H_2S$ removal by the reactor was 97.4%.

Example 3

The same reactor used in example 1 was operated under the following conditions:
  Steam flow rate=92.6 grams/hr.
  Steam pressure=85 psia.
  Oxygen flow rate=13.65 cm³/min.
  $H_2S$ & $N_2$ mixture flow rate=160 cm (containing 5.41% by volume of $H_2S$)

The reactor inlet stream had a $H_2S$ content of 6819 ppm by weight. The $O_2$ to $H_2S$ molar ratio was 1.58. The measured $H_2S$ content in the reactor effluent was 1773 ppm wt. Therefore, the $H_2S$ removal by the reactor was 74%.

Example 4

The same reactor as in example 1 was operated in the following conditions:
  Steam flow rate=125 grams/hr.
  Steam pressure=85 psia.
  Oxygen flow rate=136.3 cm³/min
  $H_2S$ & $N_2$ mixture flow rate=320 cm³/min (containing 5.41% by volume of $H_2S$)

This reactor inlet stream has a $H_2S$ content of 8477 ppm by weight. The $O_2$ to $H_2S$ molar ratio was 7.9. The measured reactor effluent $H_2S$ content was only 34 ppm wt. Therefore, the reactor removed 99.6% of the incoming $H_2S$.

Example 5

A demonstration unit located at Geysers area, Lake County, Calif. was operating for 1055 hrs., the reactor size and process conditions are outlined in Table 1.

The results of the field data collected with this demostration reactor are shown in Table 2 which shows a variety of pressure and molar ratios of oxygen to hydrogen sulfide. It is apparent that the results therein, where the molar ratio of oxygen to hydrogen sulfide was greater than 10, confirm the results of Tipton in U.S. Pat. No. 4,374,106.

Surprisingly and contrary to the teaching of Tipton, the process of the present invention is effective in removing hydrogen sulfide from geothermal steam at molar ratio of oxygen to hydrogen sulfide of significately less than 10.

Importantly in run No. 2015 the reactor effluent was condensed and a 96 gram liquid example was collected which contained yellowish solids. After filtration and separating the yellow solids on electron microprobe analysis identified the yellow solids to be 99% sulfur.

Although there has been described hereinabove a specific process for removing hydrogen sulfide from geothermal steam directly or from the vent stream of an $H_2S$ separation, in accordance with the invention for purposes of illustrating the manner in which the invention may be used to advantage, it will be appreciated that the invention is not limited thereto. According by, any and all modifications, variations or equivalent arrangements which may occur to those skilled in the art should be consider to be within the scope of the invention as defined in the appended claims.

TABLE 1

| | |
|---|---|
| Reactor Dimension | 42 inch diameter |
| Catalyst Volume | 48 ft³ |
| Total duration of run | 1060 hours |
| Catalyst support | Scoriaceous Volcanic Rock (Lake Coundy Red Pumice) |
| Steam Flow Rate, lb/hr | 4,900–11,783 |
| Reactor Pressure, PSIA | 35–129 |
| Inlet $H_2S$ Content, ppm wt | 215–1,055 |
| Inlet $H_2S$ concentration lb-mole/ft³ | $0.9 \times 10^{-6}$–$6.6 \times 10^{-6}$ |
| Molar ratio $O_2$ to $H_2S$ | 0–48 |
| $H_2S$ Removal | 26%–99.2% |
| Contact time based on total flow, second | 3.0–5.9 |
| Superficial linear Velocity, ft/sec | 0.8–1.7 |
| $H_2S$ weight space time lb-hour/lb-mole | $1.3 \times 10^4$–$9.0 \times 10^4$ |
| Pressure drop across reactor, PSI | 1–3 |
| Steam (inlet) temperature, °F. | 279–352 |

TABLE 2

| RUN NO. | ACCU-MULATED HOURS | RE-ACTOR PRES-SURE PSIA | $H_2S$ CONTENT IN REACTOR INLET, PPM WT | MOLAR RATIO $O_2$ TO $H_2S$ | % REMOVAL OF $H_2S$ |
|---|---|---|---|---|---|
| 1010 | 28. | 35. | 509. | 15.4 | 79.0 |
| 1049 | 108. | 111. | 276. | 30.0 | 91.3 |
| 1106 | 223. | 111. | 692. | 13.3 | 82.9 |
| 1123 | 257. | 112. | 786. | 6.7 | 77.0 |
| 1149 | 310. | 111. | 1055. | 9.4 | 64.4 |
| 1174 | 354. | 112. | 308. | 19.0 | 87.5 |
| 1212 | 435. | 110. | 823. | 8.6 | 64.5 |
| 1234 | 479. | 109. | 658. | 7.6 | 73.6 |
| 1254 | 600. | 117. | 902. | 3.7 | 54.3 |
| 1308 | 774. | 71. | 401. | 21.7 | 80.8 |
| 1315 | 818. | 71. | 700. | 12.8 | 78.9 |
| 2005 | 845. | 97. | 271. | 16.1 | 97.8 |
| 2015 | 938. | 95. | 262. | 5.0 | 97.3 |
| 2020 | 1006. | 92. | 292. | 0.0 | 26.0 |
| 2026 | 1055 | 53. | 267. | 6.8 | 59.0 |

What is claimed is:

1. A process for removing hydrogen sulfide from geothermal steam comprising the steps of:
  introducing an oxygen-containing gas into steam produced by a geothermal source, said steam comprising water vapor and hydrogen sulfide and having a temperature of at least about 250° F., said oxygen-containing gas being introduced into said steam in an amount to provide a molar ratio of oxygen-tohydrogen sulfide in the steam and oxygen-containing gas to be less than about 1.5 to about 8.0;

contacting the steam and oxygen containing gas in a contacting stage with iron oxide supported by a carrier resistant to deterioration by said steam; and, providing the steam and oxygen-containing gas in the contacting stage at a pressure between about 35 psia and about 130 psia to enable removal of a majority of the hydrogen sulfide from said steam and oxygen-containing gas.

2. The process of claim 1 wherein the molar ratio of oxygen-to-hydrogen sulfide in the steam and oxygen-containing gas is about 5 and the steam and oxygen containing gas is provided in the contacting stage at about 100 psia.

3. The process of claim 2 wherein the steam-resistant carrier comprises pumice.

4. The process of claim 2 wherein the oxygen-containing gas comprises air.

5. A process for removing hydrogen sulfide from geothermal steam comprising the steps of:

introducing air into steam produced by a geothermal source, said steam comprising water vapor and hydrogen sulfide and having a temperature of at least about 250° F., said air being introduced into said steam in an amount to provide a molar ratio of oxygen-to-hydrogen sulfide in the steam and air to be less than about 1.5 to about 8.00;

contacting the steam and air in a contacting stage with iron oxide supported by a carrier resistant to deterioration by said steam;

providing the steam and air in the contacting stage at a pressure between about 35 psia and about 130 psia to remove a majority of the hydrogen sulfide from said steam and air; and, withdrawing steam and air, from the contacting stage, having a lower hydrogen sulfide content than the steam and air contacted with said iron oxide in the contacting stage.

6. A process for removing hydrogen sulfide from geothermal steam comprising the steps of:

introducing an oxygen-containing gas into steam produced by a geothermal source, said steam comprising water vapor and hydrogen sulfide and having a temperature of at least about 250° F., said oxygen-containing gas being introduced into said steam in an amount to provide a molar ratio of oxygen-to-hydrogen sulfide in the steam and oxygen-containing gas to be less than 1.5 to about 8.0;

contacting the steam and oxygen containing gas in a contacting stage with iron oxide supported by a carrier resistant to deterioration by said steam;

providing the steam and oxygen-containing gas in the contacting stage at a pressure between about 35 psia and about 130 psia to enable formation of elemental sulfur and removal of hydrogen sulfide from the steam and oxygen-containing gas, said sulfur remaining in said steam and oxygen-containing gas; and, withdrawing said steam, oxygen-containing gas and sulfur from said contacting stage; and, separating said sulfur from said steam and oxygen containing gas.

7. The process of claim 6 wherein the molar ratio of oxygen-to-hydrogen sulfide in the steam and oxygen-containing gas is about 5 and the steam and oxygen containing gas is provided in the contacting stage at about 100 psia.

8. The process of claim 7 wherein the steam-resistant carrier comprises pumice.

9. A process for removing hydrogen sulfide from geothermal steam comprising the steps of:

introducing air into steam produced by a geothermal source, said steam comprising water vapor and hydrogen sulfide and having a temperature of at least about 250° F., said air being introduced into said steam in an amount to provide a molar ratio of oxygen-to-hydrogen sulfide in the steam and air to be less than about 1.5 to about 8.0;

contacting the steam and air in a contacting stage with iron oxide supported by a carrier resistant to deterioration by said steam, providing the steam and air in the contacting stage at a pressure of about 100 psia in order to cause formation of elemental sulfur and removal of hydrogen sulfide from the steam and air, said sulfur remaining in said steam and air;

withdrawing said steam, air and sulfur from said contacting stage; and, separating said sulfur from said steam and air.

10. A process for removing hydrogen sulfide from geothermal steam comprising the steps of:

removing steam from a geothermal source, said steam comprising water vapor and hydrogen sulfide and having a temperature of at least about 250° F.;

introducing the steam into a first stage thermal compressor;

introducing air into the first stage thermal compressor, in which the air is compressed and mixed with the steam introduced into the first stage thermal compressor;

withdrawing mixed compressed air and steam and introducing same into a second stage thermal compressor with additional steam to further compress the mixed compressed air and steam to a final mixture of compressed air and steam, having a molar ratio of oxygen-to-hydrogen sulfide of less than about 1.5 to about 8.00;

contacting the final mixture of compressed air and steam in a reactor with iron oxide supported by a carrier resistant to deterioration by said steam;

controlling the pressure of the final mixture of compressed air and steam in the reactor by means of a back pressure valve, said pressure being between about 35 psia and about 130 psia to enable removal of a majority of the hydrogen sulfide from the final mixture of compressed air and steam;

removing steam from the reactor, said steam having a majority of the hydrogen sulfide removed therefrom; and, venting the removed steam to the atmosphere.

11. A process for removing hydrogen sulfide from geothermal steam comprising the steps of:

removing steam from a geothermal source, said steam comprising water, vapor and hydrogen sulfide and having a temperature of at least about 250° F.;

throttling the removed steam to a preselected pressure;

straining the throttled steam to remove any large solid particles;

separating any liquid droplets from the strained steam;

introducing the separated steam into a first stage thermal compressor;

introducing air into the first stage thermal compressor in which the air is compressed and mixed with the steam introduced into the first stage thermal compressor;

withdrawing mixed compressed air and steam and introducing same into a second stage thermal compressor with additional strained steam to further compress the mixed compressed air and steam to a final mixture of compressed air and steam, having a molar ratio of oxygen-to-hydrogen sulfide of less than about 1.5 to about 8.0;

contacting the final mixture of compressed air and steam in a reactor with iron oxide supported by pumice;

controlling the pressure of the final mixture of compressed air and steam in the reactor by means of a back pressure valve, said pressure being between about 35 psia and about 130 psia to enable removal of a majority of the hydrogen sulfide from the final mixture of compressed air and steam;

removing steam from the reactor, said steam having a majority of the hydrogen sulfide removed therefrom; and, venting the removed steam to the atmosphere.

12. A process for removing hydrogen sulfide from geothermal steam comprising the steps of:

removing steam from a geothermal source, said steam comprising water vapor and hydrogen sulfide and having a temperature of at least about 250° F.;

throttling the removed steam to a preselected pressure;

straining the throttled steam to remove any large solid particles;

separating any liquid droplets from the strained steam;

introducing the separated steam into a first stage thermal compressor;

introducing air into the first stage thermal compressor, in which the air is compressed and mixed with the steam introduced into the first stage thermal compressor;

withdrawing mixed compressed air and steam and introducing same into a second stage thermal compressor with additional strained steam to further compress the mixed compressed air and steam to a final mixture of compressed air and steam, having a molar ratio of oxygen-to-hydrogen sulfide of less than about 5;

contacting the final mixture of compressed air and steam in a reactor with iron oxide supported by pumice;

controlling the pressure of the final mixture of compressed air and steam in the reactor by means of a back pressure valve, said pressure being controlled to about 100 psia;

removing steam from the reactor, said steam having a majority of the hydrogen sulfide removed therefrom; and, venting the removed steam to the atmosphere.

13. A process for removing hydrogen sulfide from geothermal steam comprising the steps of:

removing steam from a geothermal source, said steam comprising water vapor and hydrogen sulfide;

separating the steam into a useable portion comprising water vapor and a vent portion comprising water vapor and hydrogen sulfide, the hydrogen sulfide content of the vent portion being greater than the hydrogen sulfide content of the geothermal steam;

introducing an oxygen-containing gas into said vent portion, said vent portion having a temperature of at least about 250° F., said oxygen-containing gas being introduced into said vent portion in an amount to provide a molar ratio of oxygen-to-hydrogen sulfide in the vent portion and oxygen-containing gas to be less than about 1.5 to about 8.0;

contacting the vent portion and oxygen-containing gas in a contacting stage with iron oxide supported by a carrier resistant to deterioration by said vent portion; and, providing the vent portion and oxygen-containing gas in the contacting stage at a pressure between about 35 psia and about 130 psia to enable removal of a majority of the hydrogen sulfide from said vent portion and oxygen-containing gas.

14. The process of claim 13 wherein the hydrogen sulfide concentration in the vent portion is about 20 times the hydrogen sulfide concentration in the steam.

15. The process of claim 14 wherein the molar ratio of oxygen-to-hydrogen sulfide in the vent portion and oxygen-containing gas is about 5 and the vent portion and oxygen-containing gas is provided in the contacting stage at about 100 psia.

16. The process of claim 15 wherein the steam-resistant carrier comprises pumice.

17. The process of claim 16 wherein the oxygen-containing gas comprises air.

18. A process for removing hydrogen sulfide from geothermal steam comprising the steps of:

removing steam from a geothermal source, said steam comprising water vapor and hydrogen sulfide;

separating the steam into a useable portion comprising water vapor and a vent portion comprising water vapor and hydrogen sulfide, the hydrogen sulfide content of the vent portion being greater than the hydrogen sulfide content of the geothermal steam;

introducing air into the vent portion, said vent portion having a temperature of at least about 250° F., said air being introduced into said steam in an amount to provide a molar ratio of oxygen-to-hydrogen sulfide in the steam and air to be less than about 1.5 to about 8.0;

contacting the vent portion and air in a
contacting stage with iron oxide supported by a carrier resistant to deterioration by said vent portion;

providing the vent portion, and air in the contacting stage at a pressure between about 35 psia and about 130 psia to remove a majority of the hydrogen sulfide from said vent portion and air; and, withdrawing vent portion and air, from the contacting stage, having a lower hydrogen sulfide content than the vent portion and air contacted with said iron oxide in the contacting stage.

19. A process for removing hydrogen sulfide from geothermal steam comprising the steps of:

removing steam from a geothermal source, said steam comprising water vapor and hydrogen sulfide;

separating the steam into a useable portion comprising water vapor and a vent portion comprising water vapor and hydrogen sulfide, the hydrogen sulfide content of the vent portion being greater than about 1000 ppm by weight;

introducing an oxygen-containing gas into the vent portion, said vent portion having a temperature of at least about 250° F., said oxygen-containing gas being introduced into said vent portion in an amount to provide a molar ratio of oxygen-to-hydrogen sulfide in the vent portion and oxygen-containing gas to be less than 1.5 to about 8.0;

contacting the vent portion and oxygen-containing gas in a contacting stage with iron oxide supported by a carrier resistant to deterioration by said vent portion;

providing the vent portion and oxygen-containing gas in the contacting stage at a pressure between about 35 psia and about 130 psia to enable formation of elemental sulfur and removal of hydrogen sulfide from the vent portion and oxygen-containing gas, said sulfur remaining in said vent portion and oxygen-containing gas; and, withdrawing said vent portion, oxygen-containing gas and sulfur from said contacting stage; and, separating said sulfur from said vent portion and oxygen containing gas.

20. The process of claim 13 wherein the hydrogen sulfide concentration in the vent portion is up to about 8500 ppm by weight.

21. The process of claim 20 wherein the molar ratio of oxygen-to-hydrogen sulfide in the vent portion and oxygen-containing gas is about 5 and the vent portion and oxygen-containing gas is provided in the contacting stage at about 100 psia.

22. The process of claim 21 wherein the steam-resistant carrier comprises pumice.

23. A process for removing hydrogen sulfide from geothermal steam comprising the steps of:

removing steam from a geothermal source, said steam comprising water vapor and hydrogen sulfide;

separating the steam into a useable portion comprising water vapor and a vent portion comprising water vapor and hydrogen sulfide, the hydrogen sulfide content of the vent portion being greater than about 1000 ppm by weight, said vent portion having a temperature of at least about 250° F.;

introducing the vent portion into a first stage thermal compressor;

introducing air into the first stage thermal compressor, in which the air is compressed and mixed with the vent portion introduced into the first stage thermal compressor;

withdrawing mixed compressed air and vent portion and introducing same into a second stage thermal compressor with additional vent portion to further compress the mixed compressed air and steam, having a molar ratio of oxygen-to-hydrogen sulfide of less than about 1.5 to about 8.0;

contacting the final mixture of compressed air and vent portion in a reactor with iron oxide supported by a carrier resistant to deterioration by said vent portion;

controlling the pressure of the final mixture of compressed air and vent portion in the reactor by means of a back pressure valve, said pressure being between about 35 psia and about 130 psia to enable removal of a majority of the hydrogen sulfide from the final mixture of compressed air and vent portion;

removing a clean vent portion from the reactor, said clean vent portion having a majority of the hydrogen sulfide removed therefrom; and, venting the removed clean vent portion to the atmosphere.

24. A process for removing hydrogen sulfide from geothermal steam comprising the steps of:

removing steam from a geothermal source, said steam comprising water vapor and hydrogen sulfide;

separating the steam into a useable portion comprising water vapor and a vent portion comprising water vapor and hydrogen sulfide, the hydrogen sulfide content of the vent portion being greater than about 1000 ppm by weight;

introducing air into the first stage thermal compressor, in which the air is compressed and mixed with the vent portion steam introduced into the first stage thermal compressor;

withdrawing mixed compressed air and vent portion steam and introducing same into a second stage thermal compressor with additional vent portion steam to further compress the mixed compressed air and steam, having a molar ratio of oxygen-to-hydrogen sulfide of less than about 1.5 to about 8.0;

contacting the final mixture of compressed air and steam in a reactor with iron oxide supported by pumice;

controlling the pressure of the final mixture of compressed air and steam in the reactor by means of a back pressure valve, said pressure being between about 35 psia and about 130 psia to enable formation of elemental sulfur and removal of a majority of the hydrogen sulfide from the final mixture of compressed air and steam, said sulfur remaining in said steam and air;

removing a mixture of steam, air and sulfur from the reactor;

separating the sulfur from the mixture of steam, air and sulfur; and, venting steam and air, separated from the mixture of steam, air and sulfur, to the atmosphere.

25. The process of claim 1 wherein over 90 percent of the hydrogen sulfide is removed from the steam and oxygen-containing gas.

26. The process of claim 6 wherein over 90 percent of the hydrogen sulfide is removed from the steam and oxygen-containing gas.

27. The process of claim 5 wherein over 90 percent of the hydrogen sulfide is removed from the steam and air.

28. The process of claim 9 wherein over 90 percent of the hydrogen sulfide is removed from the steam and air.

29. The process of claim 10 wherein over 90 percent of the hydrogen sulfide is removed from the final mixture of compressed air and steam.

30. The process of claim 11 wherein over 90 percent of the hydrogen sulfide is removed from the final mixture of compressed air and steam.

31. The process of claim 13 wherein over 90 percent of the hydrogen sulfide is removed from said vent portion and oxygen-containing gas.

32. The process of claim 19 wherein over 90 percent of the hydrogen sulfide is removed from said vent portion and oxygen-containing gas.

33. The process of claim 18 wherein over 90 percent of the hydrogen sulfide is removed from said vent portion and air.

34. The process of claim 23 wherein over 90 percent of the hydrogen sulfide is removed from the final mixture of compressed air and vent portion.

35. The process of claim 24 wherein over 90 percent of the hydrogen sulfide is removed from the final mixture of compressed air and steam.

* * * * *